Patented Dec. 5, 1950

2,533,163

UNITED STATES PATENT OFFICE 2,533,163

DEHYDRATION OF SODIUM SULFIDE

Joseph P. Copes, Easton, Pa., and Clyde McKinley, Belvidere, N. J., assignors to General Aniline & Film Corporation, New York, N. Y., a corporation of Delaware No Drawing. Application December 27, 1948, Serial No. 67,572

4 Claims. (Cl. 23—134)

This invention relates to dehydration of sodium sulfide containing water of crystallization, particularly $Na_2S.9H_2O$.

Sodium sulfide is obtained commercially in the form of crystals having the formula $Na_2S.9H_2O$, or in the form of pellets, flakes or chips, produced by solidifying a hot aqueous solution of sodium sulfide having a concentration of about 60% $Na_2S$. One disadvantage of the crystals, pellets, chips, and flakes is that water is present in all of them. Anhydrous sodium sulfide is very desirable or even absolutely essential in certain types of chemical reactions involving sodium sulfide where the presence of water changes the course of the reaction or leads to undesirable side reactions.

Various processes have been suggested heretofore to dehydrate sodium sulfide containing water of crystallization, involving for example, heating the crystalline materials to temperatures at which, in some cases, at least partial fusion occurs, and agitating (for example, with a plough-type agitator), while removing moisture under reduced pressure. When partially fused, the sodium sulfide has the consistency of dough or paste, and therefore requires large amounts of power and relatively heavy and expensive equipment to provide adequate agitation. Moreover, the purest product indicated as obtained in such processes, with or without partial fusion, has a content of only 96% $Na_2S$.

We have discovered that sodium sulfide containing water of crystallization, particularly $Na_2S.9H_2O$, can be readily dehydrated without agitation to porous lumps having substantially the same shape and size as the original crystals, by heating the material under reduced pressure while progressively increasing the temperature to 750–850° C. at such a rate that no fusion of the sodium sulfide occurs. By employing crystalline material which is substantially chemically pure, substantially anhydrous sodium sulfide can be obtained containing more than 99% $Na_2S$. The product, by virtue of its porous granular nature, dissolves readily and rapidly in appropriate solvents, e. g. water, alcohol, and the like. Moreover, when dry, it possesses fairly good resistance to disintegration and dusting, which is of considerable importance in the handling of the material.

Since the product contains essentially no water, it is especially well adapted for use in chemical processes requiring anhydrous sodium sulfide. Thus, in reactions requiring sodium sulfide, in which water interferes by reacting quantitatively with the other reagents to the exclusion of sodium sulfide, minor percentages of residual water in the sodium sulfide produce disproportionately large losses in yield. For example, if the sodium sulfide contains 18.8% water and 81.2% $Na_2S$ (i. e., equimolecular amounts), the yield would be zero; while if the 96% $Na_2S$ of the prior art, containing 4% water were used, the maximum yield would be about 75%. By comparison, the highly dehydrated sodium sulfide of this invention permits yields higher than 95% of theory.

The equipment required for producing anhydrous sodium sulfide according to our invention is relatively simple, involving a muffle-type oven adapted to be evacuated. No agitation is required, and sodium sulfide to be dehydrated as well as the dehydrated product can be introduced and removed through suitable valve chambers.

Our invention is illustrated by the following example:

Example

Large crystals of $Na_2S.9H_2O$, ranging up to about one-inch in the longest dimension, were placed in a one and one-half inch diameter stainless steel tube provided with an interior thermowell for temperature measurement, sealed at both ends, and having a duct for connection to a vacuum pump. Pressure in the tube was reduced to 1 mm. of Hg absolute and the tube was heated externally by radiating electric resistance coils. The temperature was measured by means of a thermocouple inserted in the thermowell, and controlled by varying the electric current into the resistance coils. The heating was carried out so as to raise the temperature progressively to about 810° C. while maintaining the pressure at 1 mm. of Hg as follows:

| Time in Hours | Temperature in ° C. |
|---|---|
| 0 | 29 |
| 0½ | 68 |
| 1 | 92 |
| 1½ | 198 |
| 2 | 296 |
| 2½ | 332 |
| 3 | 404 |
| 3½ | 428 |
| 4 | 466 |
| 4½ | 538 |
| 5 | 668 |
| 5½ | 760 |
| 6 | 798 |
| 6½ | 810 |
| 7 | 810 |

Under the foregoing conditions, fusion of the sodium sulfide was completely prevented. Contents of the tube were allowed to cool and then discharged. The sodium sulfide discharged from the tube was in the form of lumps having a porous, chalky appearance and being of substantially the same size and shape as the original crystals. By analysis, it was found that the lumps contained 99.5% $Na_2S$. The lumps readily dissolve in appropriate solvents at a rapid rate as compared with the original sodium sulfide crystals, or as compared with partly dehydrated sodium sulfide flakes, chips or pellets. The lumps of material moreover, showed no substantial tendency to crumble or to form dust.

In carrying out the dehydration of crystalline sodium sulfide in accordance with this invention, the pressure is maintained below the vapor pressure of all solid hydrous portions of the sodium sulfide undergoing dehydration, while avoiding fusion of any portion of the material as the temperature is progressively increased. For practical purposes, the pressure is preferably maintained, as illustrated in the example, at about 1 mm. of Hg. When a pressure of this order is maintained, the crystalline sodium sulfide can be heated without fusion thereof from room temperature (e. g. 20–30° C.) to 90–100° C. over a period of one hour, and the temperature then raised progressively to 750–850° C. during the succeeding 4–6 hours while maintaining the temperature substantially at a value represented by the formula $[140t-40]°$ C. in the range of $t$ greater than 1 hour, $t$ being the total heating time in hours. The temperature can be raised to 750–850° C. at a slower rate than given by the aforesaid formula to obtain similar results; or if desired, the heating can be carried out with intervening cooling periods, although the additional time thereby required would ordinarily constitute a disadvantage. For the most effective operation, however, the temperature, after the first hour, is preferably maintained within the range $$[140t-40\pm(10t+20)]°\ C.$$

until the final temperature of 750–750° C. is reached, the pressure being preferably maintained at about 1 mm. of Hg as illustrated in the example.

As indicated in the example, the sodium sulfide can be heated in a muffle-type oven with external heating, or in any type of apparatus affording equally efficient heating while avoiding excessive localized overheating of the material.

Other variations and modifications which will be obvious to those skilled in the art can be made in the process described above without departing from spirit or scope of this invention.

We claim:
1. Process for dehydrating crystalline sodium sulfide containing water of crystallization, which comprises heating the crystals under reduced pressure while progressively increasing the temperature to 750–850° C. at such a rate as to prevent fusion of the sodium sulfide.

2. Process for dehydrating crystalline $Na_2S.9H_2O$ which comprises heating the crystals at an absolute pressure below the vapor pressure of residual solid hydrous sodium sulfide while progressively increasing the temperature to 750–850° C. over a period not less than five hours at such a rate as to prevent fusion of the sodium sulfide.

3. Process for dehydrating hydrous crystalline sodium sulfide, which comprises heating the crystals at an absolute pressure of about 1 mm. of Hg while progressively raising the temperature to 80–120° C. during not less than one hour, and then progressively raising the temperature in not less than four additional hours to 750–850° C., at a rate such that the temperature does not exceed that expressed substantially by the formula $[140t-40]°$ C. during the latter period in the range of $t$ greater than one hour, $t$ representing the total heating time in hours, the rate of heating being such as to avoid fusion of the sodium sulfide.

4. Process for dehydrating crystalline $Na_2S.9H_2O$ which comprises heating the crystals at a pressure of 1 mm. of Hg while progressively raising the temperature from 20–35° C. to 80–120° C. over a period of one hour, and thereupon progressively increasing the temperature to 750–850° C. over a period of four to six additional hours while maintaining the temperature within the range $[140t-40\pm(10t+20)]°$ C., in the range of $t$ greater than one hour wherein $t$ represents the total heating time in hours.

JOSEPH P. COPES.
CLYDE McKINLEY.

REFERENCES CITED

The following references are of record in the file of this patent:

UNITED STATES PATENTS

| Number | Name | Date |
|---|---|---|
| 1,946,089 | Mayers | Feb. 6, 1934 |
| 2,106,952 | Konig | Feb. 1, 1938 |

Certificate of Correction

Patent No. 2,533,163                                           December 5, 1950

JOSEPH P. COPES ET AL.

It is hereby certified that error appears in the printed specification of the above numbered patent requiring correction as follows:

Column 3, line 43, for "750–750° C." read *750–850° C.*;

and that the said Letters Patent should be read as corrected above, so that the same may conform to the record of the case in the Patent Office.

Signed and sealed this 13th day of March, A. D. 1951.

[SEAL]

THOMAS F. MURPHY,
*Assistant Commissioner of Patents.*